United States Patent [19]

Miller et al.

[11] Patent Number: 4,593,285
[45] Date of Patent: Jun. 3, 1986

[54] WINDSHEAR DETECTION AND WARNING SYSTEM WITH EVASION COMMAND

[75] Inventors: Harry Miller, Scottsdale; Terry L. Zweifel, Phoenix, both of Ariz.

[73] Assignee: Sperry Corporation, New York, N.Y.

[21] Appl. No.: 492,085

[22] Filed: May 6, 1983

[51] Int. Cl.⁴ .............................................. G08B 23/00
[52] U.S. Cl. .................................. 340/968; 73/178 T;
244/191; 244/76 C; 340/963; 340/967;
364/427; 364/428; 364/434
[58] Field of Search ........................... 340/966–970,
340/963; 364/427, 428, 433, 434, 565, 426;
244/181, 191, 76 C; 73/178 T

[56] References Cited

U.S. PATENT DOCUMENTS

| | | | |
|---|---|---|---|
| 3,662,976 | 5/1972 | Gesler | 364/440 |
| 3,814,912 | 6/1974 | Manke et al. | 340/968 |
| 4,079,905 | 3/1978 | Greene | 244/191 |
| 4,127,249 | 11/1978 | Lambregts | 244/191 |
| 4,229,725 | 10/1980 | Reilly | 244/182 |
| 4,347,572 | 8/1982 | Berwick, Jr. et al. | 244/181 |
| 4,422,147 | 12/1983 | Hanke | 364/440 |

Primary Examiner—John W. Caldwell, Sr.
Assistant Examiner—Brent A. Swarthout
Attorney, Agent, or Firm—Howard P. Terry

[57] ABSTRACT

A windshear warning apparatus which separately compares a plurality of signals derived from horizontal and vertical inertial acceleration and air mass acceleration components to indicate incipient windshear. The compared signals are substantially equal under normal wind conditions but are significantly different under windshear conditions. A signal proportional to the product of the magnitude and rate of change of the total or resultant inertial acceleration of the aircraft is used to provide a warning of a significant windshear condition.

11 Claims, 10 Drawing Figures

WIND SHEAR DETECTION SYSTEM

DIAGRAM SHOWING CHANGES IN MAGNITUDE AND DIRECTION OF AIRCRAFT ACCELERATION VECTOR WHEN SUBJECTED TO A WIND DOWN BURST

ACCELERATION VECTOR
IN VERTICAL PLANE

ANGLE OF ATTACK DISPLAY FOR
WIND SHEAR DETECTION SYSTEM

WINDSHEAR DETECTION AND WARNING SYSTEM WITH EVASION COMMAND

BACKGROUND OF THE INVENTION

1. Field of the Invention

The present invention relates generally to aircraft flight performance computer systems and more particularly to a system for detecting and/or providing a warning of impending dangerous windshear conditions and to provide an avoidance command through the pitch director and throttle systems to enable the flight crew to avoid such conditions in a timely and safe manner.

2. Description of the Prior Art

Windshear is a weather condition which results in rapidly changing wind velocity and direction and in terms of aircraft flight performance is, of course, most dangerous during takeoffs and landing approaches. A number of attempts and proposals have been made to provide the flight crew of an aircraft with a warning of impending windshear conditions. One method that is presently in use is based on ground observations of wind conditions at sporadic locations around an airport. These wind determinations have been shown to be inadequate during several occurrences which have resulted in serious accidents. Other methods utilize on-board apparatus for detecting ground speed and comparing the ground speed to a measure of the airspeed of the aircraft and may include some sensing of vertical inertial acceleration. U.S. Pat. Nos. 4,012,713 and 4,079,905 are typical of such systems. A prior system previously described by one of the present inventors is based on the energy residing in the aircraft at any instant as it proceeds along a flight path, as in U.S. patent application Ser. No. 239,289, filed Mar. 2, 1981, now abandoned. A deficiency of the prior on-board systems is that while they may be effective in determining horizontal wind variations, they are inadequate for adequately determining vertical wind variations such as downdrafts and updrafts. Analyses of accidents that have been caused by severe wind variations near the ground indicate that they are composed of rapidly changing combinations of both wind components. These result in rapid changes in the magnitude and direction of the total acceleration vector which determines the aircraft's flight path in the vertical plane.

A typical windshear situation is graphically illustrated in FIG. 1. An aircraft approaching a runway, 3, attempts to fly along a glide slope, 4, defined as the straight line between $P_1$ and $P_2$. If a wind downburst exists along the glide slope, as illustrated in FIG. 1, the initial effect on the aircraft occurs at a point $0_1$ on the glide slope, where it encounters an increasing headwind. This causes an increase in lift and a deceleration relative to the ground. The acceleration vector, designated $A_{VH}$, is the resultant of the inertial vertical acceleration component, $a_V$ and the inertial horizontal acceleration compenent, $a_H$. At point $0_1$, the vector $A_{VH}$ points upward and backward with respect to the aircraft's path relative to the ground. Thus, there is a significant change in the magnitude of the resultant acceleration vector as the aircraft travels between $P_1$, where there is no appreciable acceleration vector and $0_1$ where there now exists a sizeable acceleration vector.

The increase in lift at point $0_1$ causes the flight path, 5 of the aircraft to go above the glide slope 4. There is also an increase in airspeed at $0_1$ due to the inertia of the aircraft carrying it into the headwind and in spite of the fact that the aircraft is being decelerated relative to the ground. The pilot's normal reaction under these conditions is to reduce thrust and pitch the aircraft down to reduce airspeed and to realign the aircraft to its intended glide path 4.

As the aircraft passes the center of the wind burst column, the headwind changes to a tailwind. The tailwind causes a decrease in airspeed, again due to its inertia, carrying it with the tailwind and a forward acceleration relative to the earth. The decrease in airspeed now results in a loss of lift at point $0_2$. The combined actions of the reduction of thrust at $0_1$, the pitch down maneuver at 5, forward acceleration at $0_2$ and the loss of lift at $0_2$ results in a larger resultant acceleration vector at $0_2$ which is directed forwardly and downwardly. If not corrected rapidly by the pilot by increasing thrust and pitching the aircraft nose up to increase its angle of attack, the aircraft will impact the ground violently at point 6. In the windshear example discussed above, it will be noted that during the transition from point $0_1$ to point $0_2$, the direction of the total acceleration vector $A_{VH}$ has undergone a larger angular rotation on the order of 180°.

SUMMARY OF THE INVENTION

Under normal flight conditions, that is, no wind or essentially steady state winds, the inertial and air mass accelerations of an aircraft will be essentially equal while in rapidly changing winds they will not be essentially equal. Therefore, the vertical and horizontal components of the aircraft's inertial acceleration are compared with the vertical and horizontal components of the aircraft's acceleration relative to the sustaining air mass and any discrepancy above a predetermined value is used to initiate a warning that a windshear condition exists. The rate of change of any discrepancy, together with the rate of rotation of the aircraft's resultant acceleration vector is monitored in both sense and magnitude so as to provide a measure of the severity of the windshear condition. When the magnitude and direction of any one of such parameters exceed prescribed limits, the warning is changed to indicate to the pilot that evasive action is required. The present invention provides flight commands through the flight director and autothrottle systems to pitch up to a maximum safe angle of attack and to increase throttle to maximum safe power setting.

DESCRIPTION OF THE PREFERRED EMBODIMENT

Referring again to FIG. 1, the wind downburst 1 shown in FIG. 1, consists of a vertical column of air which is usually generated by severe thunderstorms and moves downward toward the ground 2 where it is deflected by the ground outward from the center of the column in all directions. While this column is illustrated as centered over the glide slope approach path to the runway, its effects are the same on the runway take-off path or if the column is laterally displaced from the flight path where there are large components of the wind in the direction of flight of the aircraft.

A very significant characteristic of the aircraft's resultant or total acceleration vector $A_{VH}$ between points $0_1$ and $0_2$ is a rotation of the direction of the vector as the aircraft enters the disturbance and leaves the disturbance. It is, therefore, an object of this invention to detect not only the change in magnitude of the resultant acceleration vector $A_{VH}$, but also to detect the rate of change of its direction and to use these characteristics to provide a warning to the flight crew. It is a further object to provide thrust and pitch guidance to enable the flight crew to avoid the dangerous condition that exits during a windshear condition, such as at point $0_2$, FIG. 1.

Figure 1:
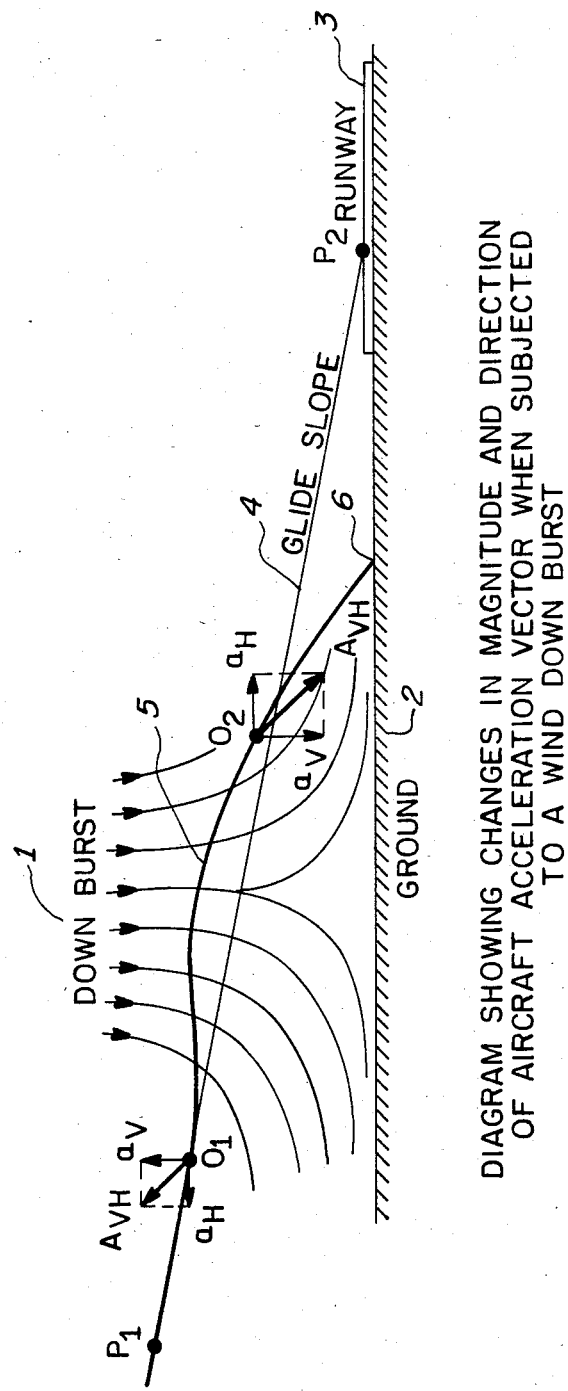
FIG. 1 is a diagram already briefly discussed which illustrates the basic problem of an aircraft encountering a downburst windshear condition during an approach to a runway.
Figure 2:
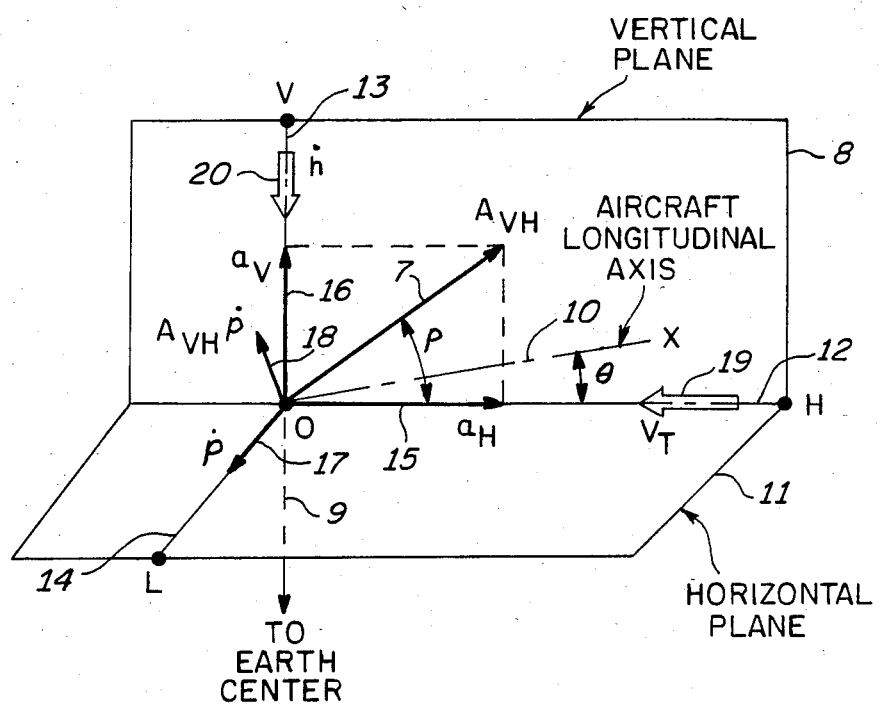
FIG. 2 is a diagram which illustrates the characteristics of the acceleration vector in the vertical plane and its relationship to aircraft movement in the air mass.

FIG. 2 illustrates the characteristics of the $A_{VH}$ acceleration vector referred to in FIG. 1. The $A_{VH}$ vector 7 is the acceleration in the vertical plane of the aircraft, considered to be a single mass at point 0. The vertical plane is defined as the plane which contains the line 9 that extends from point 0 to the center of the earth and the aircraft longitudinal axis 10, designated as the line from 0 to X. The horizontal plane 11 is orthogonal to the vertical plane and also contains the aircraft point mass at 0. The intersecting planes 8 and 11 form an earth reference from which consists of mutually orthogonal lines 12, 13, 14. Line 12 extends between points 0 and H; line 13 extends between points 0 and V; line 14 extends between points 0 and L. The angle $\theta$ is the angle between reference line 12 and aircraft longitudinal axis 10. Angle $\theta$ is defined as the pitch angle of the aircraft.

Resultant or total acceleration vector 7 consists of mutually orthogonal vector components 15 and 16. Component 15, designated $a_H$, is the inertial acceleration along reference line 12; component 16, designed $a_V$, is the inertial acceleration along reference line 13. The rate of rotation of the acceleration vector 7, as would occur in the situation previously considered in FIG. 1, is the time rate of change of angle $\rho$, which is the angle between vector 7 and inertial reference line 12. The rotational rate of 7, designated $\dot{\rho}$, is depicted as the magnitude of the vector 17 which is orthogonal to the vertical plane 8 and passes through the aircraft point mass 0. It is useful to consider the product of vectors 7 and 17. This is vector 18, designated $A_{VH} \times \dot{\rho}$, which exists in the vertical plane 8 in accordance with well known principles of such vector products. It will be noted that the cross-product of vectors $A_{VH}$ and $\dot{\rho}$ serves as a measure of the amplitude of the vertical acceleration and the rate of rotation of the total acceleration vector. The use of this cross-product assures that it is nominally near zero for small values of $A_{VH}$ (in the absence of vertical wind gusts) regardless of the value of $\dot{\rho}$ and likewise is near a null for small values of $\dot{\rho}$ (when the rotation rate of the total acceleration vector is essentially zero) regardless of the value of $A_{VH}$. Thus, significant values of $A_{VH} \times \dot{\rho}$ require both a significant magnitude of the acceleration vector and a significant rotation rate of the total acceleration vector, both of which together are indicative of a dangerous windshear condition. Accordingly, while neither $A_{VH}$ nor $\dot{\rho}$ by itself may be representataive of a dangerous windshear, when they both occur at the same time, it indicates that a dangerous windshear exists.

The aircraft longitudinal axis 10 has a movement relative to the air mass. This movement can be conveniently considered to be comprised of two orthogonal velocity components 19 and 20, existing along lines 12 and 13, respectively. True airspeed is generally designated $V_T$ and is measured along the flight path of the aircraft by a conventional air data computer. It is sufficiently accurate for the purpose of the present invention to consider that $V_T$ coincides with vector 19 since the angle between the aircraft flight path and reference line 12 is usually small for large aircraft such as transport aircraft. Vertical speed, designated $\dot{h}$, is also calculated by a conventional air data computer and is derived from the rate of change of the atmospheric static pressure existing around the aircraft.

If the aircraft is not being subjected to windshear conditions, the time rate of change of true airspeed 19, designated $\dot{V}_T$, essentially equals the horizontal inertial acceleration component 15. Similarly, the time rate of change of vertical speed 20, designated , essentially equals the vertical inertial acceleration component 16. However, these two relationships, i.e., $\dot{V}_T = a_H$ and $\ddot{h} = a_V$, are disturbed during windshear conditions, such as described in FIG. 1, and the magnitude of the disturbance is indicative of the strength of the windshear. As previously discussed, windshear conditions also result in a rotation $\rho$ of the acceleration vector 7, the rate of such rotation also being indicative of the strength or severity of the windshear. The apparatus of the present invention measures and utilizes disturbances in the foregoing relationships as criteria for detecting the magnitude and direction of any windshear that may surround the aircraft. These disturbances are designated A through E and are summarized as follows:

$$A = \ddot{h} - a_v \quad \quad 1$$

$$B = \dot{V}_T - a_H \quad \quad 2$$

$$C = \frac{d}{dt}(\ddot{h} - a_v) \quad \quad 3$$

$$D = \frac{d}{dt}(\dot{V}_T - a_H) \quad \quad 4$$

$$E = A_{VH}\dot{\rho} \quad \quad 5$$

In order to use available on-board sensors, it is convenient to express equation 5 in terms of $a_V$ and $a_H$ in equation 12 below. Its derivation is as follows, referring to FIG. 2:

$$A_{VH}^2 = a_V^2 + a_H^2 \qquad (6)$$

$$\sin \rho = \frac{a_V}{A_{VH}} \qquad (7)$$

$$\cos \rho = \frac{a_H}{A_{VH}} \qquad (8)$$

$$\frac{d}{dt}(\sin \rho) = \left(\frac{\dot{a}_V}{A_{VH}}\right) = \dot{\rho} \cos \rho \qquad (9)$$

Solving for $\dot{\rho}$ in equation 9 and substituting equation 8 therein:

$$\dot{\rho} = \left(\frac{\dot{a}_V}{A_{VH}}\right)\left(\frac{A_{VH}}{a_H}\right) \qquad (10)$$

$$A_{VH}\dot{\rho} = \left(\frac{\dot{a}_V}{A_{VH}}\right)\left(\frac{A_{VH}^2}{a_H}\right) \qquad (11)$$

Now substituting equation 16 into equation 11 and simplifying $$A_{VH}\dot{\rho} = \left(\frac{a_V^2 + a_H^2}{a_H}\right)\left(\frac{\dot{a}_V}{\sqrt{a_V^2 + a_H^2}}\right) \qquad (12)$$

The above derivation of equation 12 provides a measurement of the disturbance parameter $A_{VH}\dot{\rho}$ from direct measurements of linear accelerations acting on the aircraft and available from the same horizontal and vertical accelerometers strapped to the airframe as used in equations 1 through 4.

Figure 3:
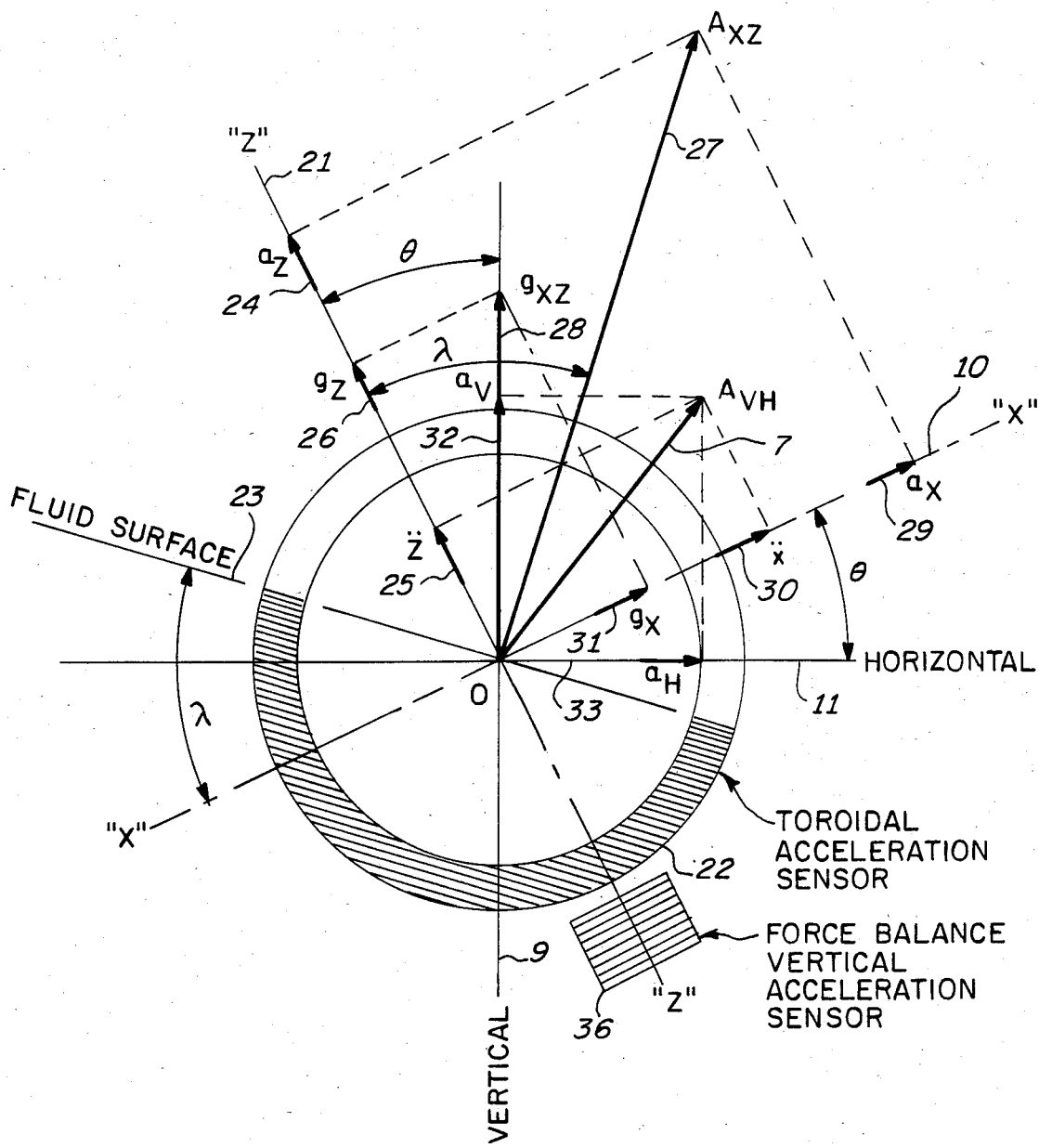
FIG. 3 is a diagram which indicates the effects of normal and longitudinal acceleration on the configuration of a liquid level toroidal sensor which is mounted on the longitudinal axis of the aircraft.

A preferred embodiment of the accelerometer configuration for use in determining the $a_V$ and $a_H$ components of the total acceleration vector, $A_{VH}$, is illustrated in FIG. 3. In order to improve the clarity of the description, FIG. 3 has been drawn to illustrate the special case where the bank angle of the aircraft is zero; that is, wings level flight which is the usual approach and take-off attitude at lower altitudes. The relationships derived for $a_V$ and $a_H$, however do include the effects of bank angle in accordance with well known principles. The aircraft bank angle is designated $\phi$ in this discussion.

The accelerometer configuration comprises a conventional force balance linear accelerometer 36, mounted with its sensing axis aligned with the Z axis 21 of the aircraft and a toroidal liquid level, or acceleration sensor 22, mounted in the X-Z plane of the aircraft, having an electrical null when the liquid surface 23 is parallel with the longitudinal X axis 10 of the aircraft. The toroid accelerometer may be of the type disclosed in the present assignee's U.S. Pat. No. 4,028,815; 3,823,486; 3,604,275; and 3,171,213.

Under the conditions shown in FIG. 2, the aircraft's X axis 10 has an attitude $\theta$ with respect to the horizontal plane 11 which is normal to the vertical line 9, (see also FIG. 2,) which extends from the center O of the toroid to the center of the earth. The angle $\theta$ is measured in a coventional manner by a vertical gyro, also mounted in the aircraft.

The Z reference line 21 is orthogonal to the X reference line 10, both of which are fixed to the vertical and longitudinal axes respectively of the fuselage of the aircraft. The normal accelerometer 36 is mounted with its sensing axis parallel to the aircraft Z axis 21. It responds to the apparent acceleration component along the Z axis in the X-Z plane of the aircraft. The apparent acceleration component 24, designated $a_Z$ in the diagram, is the sum of the true normal acceleration component 25, designated and the component 26, designed $g_Z$, of the earth gravity vector that exists in the longitudinal plane of the aircraft, X-Z.

The earth gravity vector, g, is of course always aligned with the vertical reference line 9. The gravity vector is resolved into orthogonal components, projected onto the X, Y and Z axes of the aircraft. The lateral or Y axis has been omitted from FIG. 3 in order to improve its clarity. It can be considered, however, to be a line which extends from the center of the toroid 0 at right angles to the plane of the diagram of FIG. 3. The components of the earth gravity vector are well known and can be expressed by the following general relationships which include the effect of bank angle or non-level flight:

$$g_X = g \sin \theta \qquad (13)$$

$$g_Y = g \cos \theta \sin \phi \qquad (14)$$

$$g_Z = g \cos \theta \cos \phi \qquad (15)$$

where $\theta$ and $\phi$ are the aircraft's pitch and roll angles respectively and measured by the vertical gyro in the aircraft in conventional fashion.

The apparent acceleration vector 27 in the longitudinal plane of the aircraft is designated $A_{XZ}$. For the case where bank angle $\phi$ is zero, it is the vector sum of the true acceleration vector 7 designated $A_{VH}$, and the gravity vector 28, designated $g_{XZ}$, existing in the XZ plane. The components of vector 27 in aircraft Z and X axes are 24 and 29, designated $a_Z$ and $a_X$, respectively. Using relationships 13 and 15, the value of these vectors are expressed as $$a_X = g_X + \ddot{X} = g \sin \theta + \ddot{X} \qquad (16)$$

$$a_Z = g_Z + \ddot{Z} = g \cos \theta \cos \phi + \ddot{Z} \qquad (17)$$

where the earth gravity components $g_Z$ and $g_X$ are vectors 26, 31 and where and are vectors 30 and 25 which are the components of the true acceleration vector 7 along the X and Z axes, respectively of the aircraft.

The angle $\lambda$ in the diagram, is the angle between the acceleration vector 27 and the Z axis 24 of the aircraft. It is equal to the angle between the aircraft X axis 10 and the surface 23 of the fluid in the toroid accelerometer 22 since the liquid surface will always be normal to the apparent acceleration vector 27. It, therefore, follows that the electrical output of the toroid accelerometer 22 is proportional to the angle $\lambda$ because the toroid is positioned in the aircraft to have an electrical null when the liquid surface 23 is parallel with the X axis 10 of the aircraft. The angle $\lambda$ is related to the components of the apparent acceleration vector 27 as follows:

$$\tan \lambda = \frac{a_X}{a_Z} \qquad (18)$$

Using the relationships 13 through 18, the inertial vertical acceleration component 32, designated $a_V$, and the inertial horizontal acceleration component 33, designated $a_H$, can be expressed in a general form (which also includes the effect of bank angle for completeness):

$$a_v = \ddot{Z} \cos\theta \cos\phi + \ddot{Y} \cos\theta \sin\phi + \ddot{X} \sin\theta \quad (19)$$

$$a_H = \ddot{X} \cos\theta - \ddot{Z} \sin\theta \cos\phi \quad (20)$$

where:

$$\ddot{Z} = a_z - g \cos\theta \cos\phi \quad (21)$$

$$\ddot{Y} = a_y - g \cos\theta \sin\phi \quad (22)$$

$$\ddot{X} = a_x - g \sin\theta \quad (23)$$

However, in a coordinated turn, it can be assumed that:

$$a_y = 0 \quad (24)$$

$$\ddot{Y} = -g \cos\theta \sin\phi \quad (25)$$

Therefore, relationships 19 and 20 can now be expressed:

$$a_v = a_z(\cos\theta \cos\phi + \tan\lambda \sin\theta) - g \quad (26)$$

$$a_H = a_z(\tan\lambda \cos\theta - \sin\theta \cos\phi) - g \sin\theta \cos\theta \sin^2 \quad (27)$$

The relationships 26 and 27 involve direct measurements from the normal accelerometer 36 ($a_Z$), the toroidal liquid level 22 ($\lambda$) and a vertical gyro 34 ($\theta, \phi$).

Figure 4:
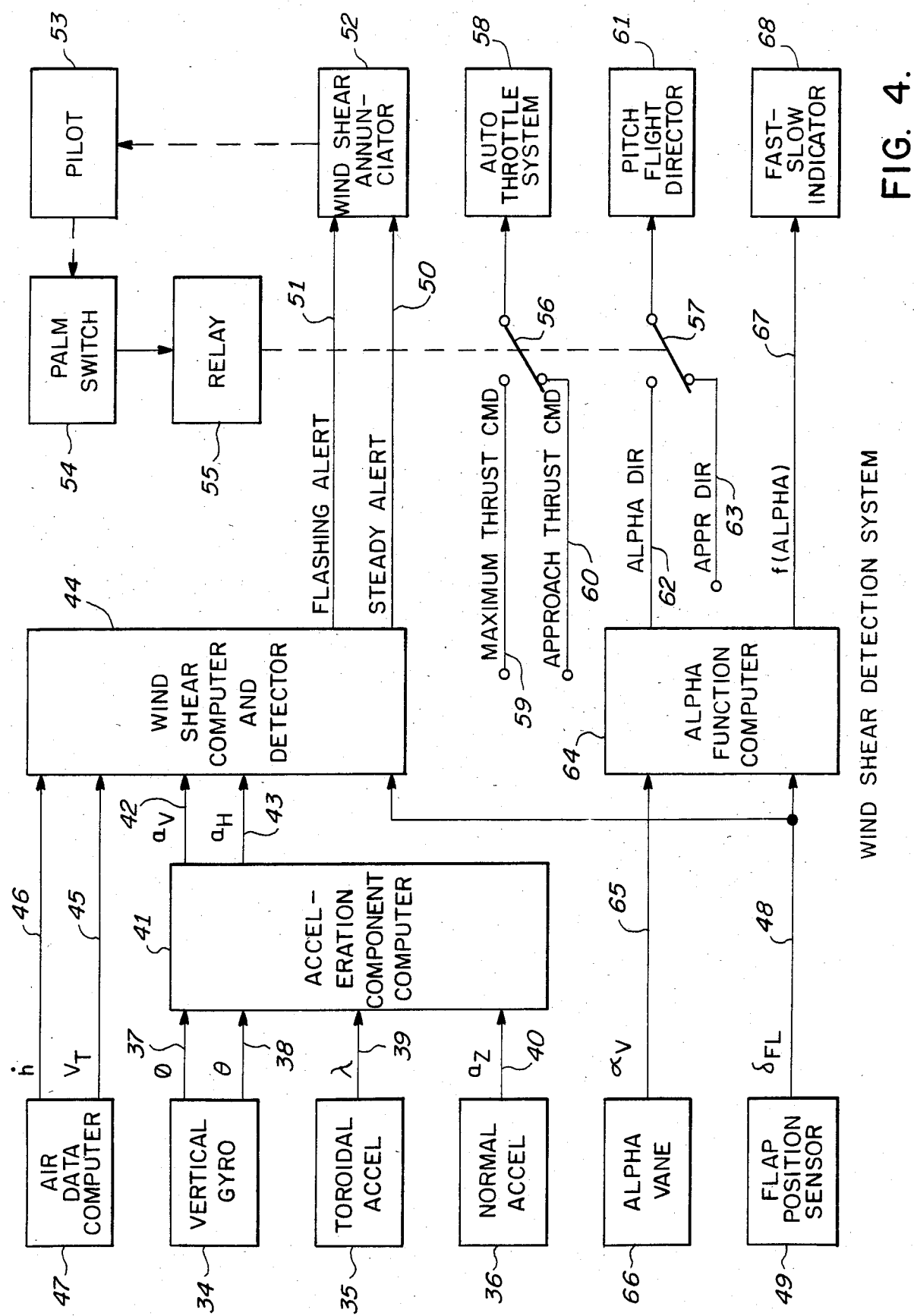
FIG. 4 is a block diagram which illustrates a preferred embodiment of the windshear detection and warning system.

Referring now to FIG. 4, a block diagram of a preferred embodiment of the windshear detection, warning and correction system is illustrated. This system may be an integral part of an aircraft performance mangement system (PMS) and preferably constitutes a separate digital computer subroutine of the PMS.

The vertical gyro 34, toroidal accelerometer 35 and normal accelerometer 36, having respective signal outputs 37, 38, 39, 40 are processed by the acceleration component computer 41 to provide $a_V$ and $a_H$ output signals 42, 43 in accordance with equations 26 and 27, previously defined. The component computer or data processor 41 for solving equations 26 and 27 is completely conventional and may be readily implemented by those skilled in this art using well known digital computer component conversion subroutines. The outputs 42 and 43 of the component computer 41 are the vertical and horizontal accelerations of the aircraft relative to the earth coordinates, i.e., relative to the ground.

Outputs 42, 43 in conjunction with true airspeed output 45, designated $V_T$, and vertical speed output 46, designated h, of air data computer 47 together with flap position output 48, (designated $\delta_{FL}$,) of flap position sensor 49 are processed by windshear computer and detector 44 to derive disturbance relationships 1 through 5, defined previously. The details of the windshear computer and detector and warning signal generator 44 will be described hereinbelow with reference to FIGS. 6 and 7. As will be described there, the disturbance relationships are combined in a manner to provide a two-level alert signal. The first level represents a moderate windshear condition and is manifested as a steady alert signal 50 which illuminates a warning light on windshear annunciator 52. The second level represents a severe windshear condition and is manifested as a flashing illumination of the warning light by alert signal 51. A corresponding audible warning may also preferably be provided.

The pilot will acknowledge the alert and warning at his discretion and operate a palm switch 54 which, in most large aircraft, is located on the throttle control levers and normally used to initiate a missed approach maneuver. The palm switch 54 latches a relay 55, having contactors 56 and 57. The function of contactor 56 is to transfer the autothrottle system 58 to operate at maximum thrust command 59 in lieu of the normal approach thrust command 60, which was the situation shown in FIG. 1. The function of contactor 57 is to transfer the pitch flight director 61 to operate on an angle of attack director signal 62 in lieu of the normal approach director signal 63, which was the situation shown in FIG. 1. Thus, in accordance with the present invention, not only is a warning given to the pilot when the aircraft experiences a windshear condition, it also provides guidance information to the pilot to enable him to maneuver the aircraft promptly and safely to avoid a dangerous situation. Upon actuation of the palm switch 54, the alpha function computer, to be described more fully below, supplies a command signal which will direct the pilot to pitch the aircraft to its maximum safe angle of attack. Normally, this angle of attack is approximately that of the stick shaker angle of attack, that is, just below the stall angle of attack. The alpha function computer also provides an angle of attack deviation signal to the fast-slow indicator 68 to provide an analog display which shows the actual aircraft situation relative to the stick shaker angle of attack.

It will now be appreciated that the aircraft will be commanded to its maximum lift configuration and avoid the windshear problem discussed with respect to FIG. 1. It is important to note that by issuing flight director command and autothrottle commands automatically, the pilot will be guided to follow an abnormal procedure rather than his normal instincts as described previously.

Figure 5A:
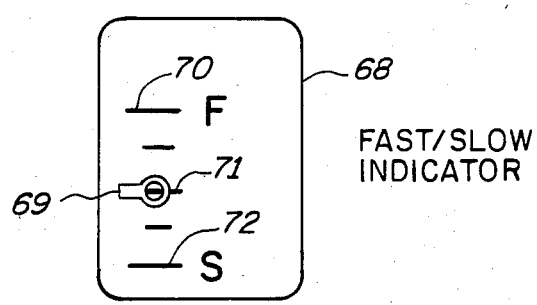
FIGS. 5A and 5B present a preferred embodiment of the angle of attack display used in the windshear detection and warning configuration shown in FIG. 3.
Figure 5B:
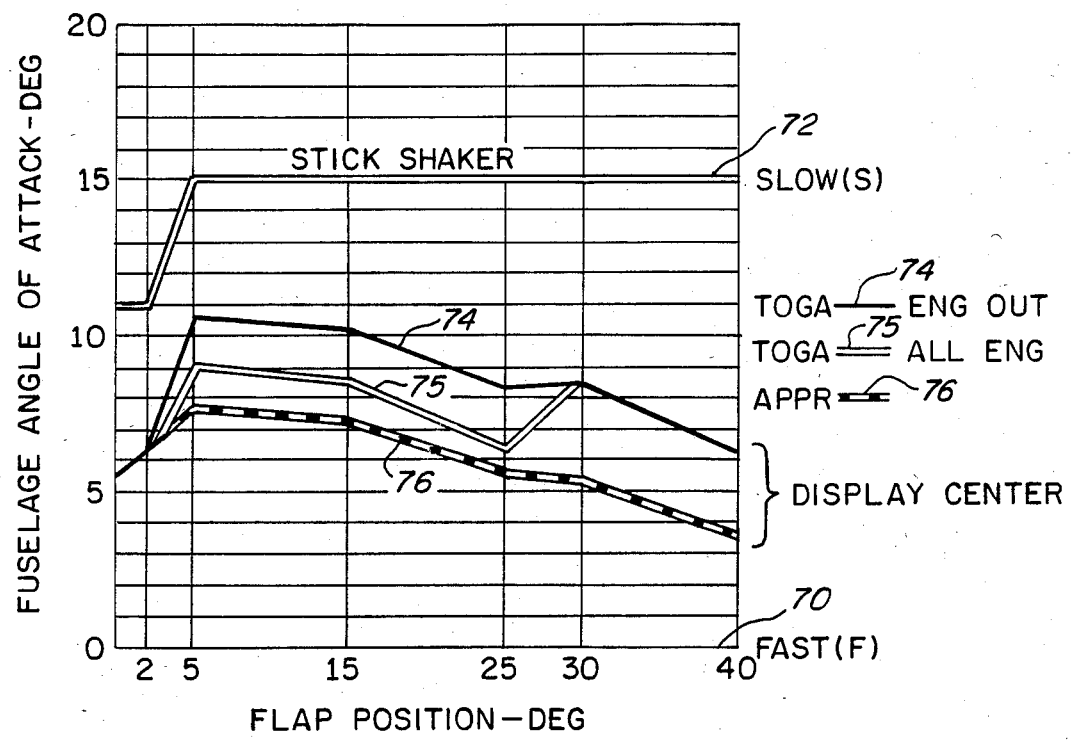

The alpha function computer 64 is used to process signal 65 from a local flow alpha vane 66 and flap position sensor output 48 to generate a true angle of attack value. The angle of attack signal 67 operates into a fast-slow indicator 68, as shown in FIGS. 5A and 5B. The alpha function generator is illustrated in block diagram format in FIG. 9. As shown, it is responsive to a signal on lead 65 proportional to the aircraft angle of attack $\alpha_V$, usually provided by a conventional vane sensor 66. It is also responsive to a signal on lead 48 proportional to the position of the flaps $\delta_{FL}$.

Figure 7:
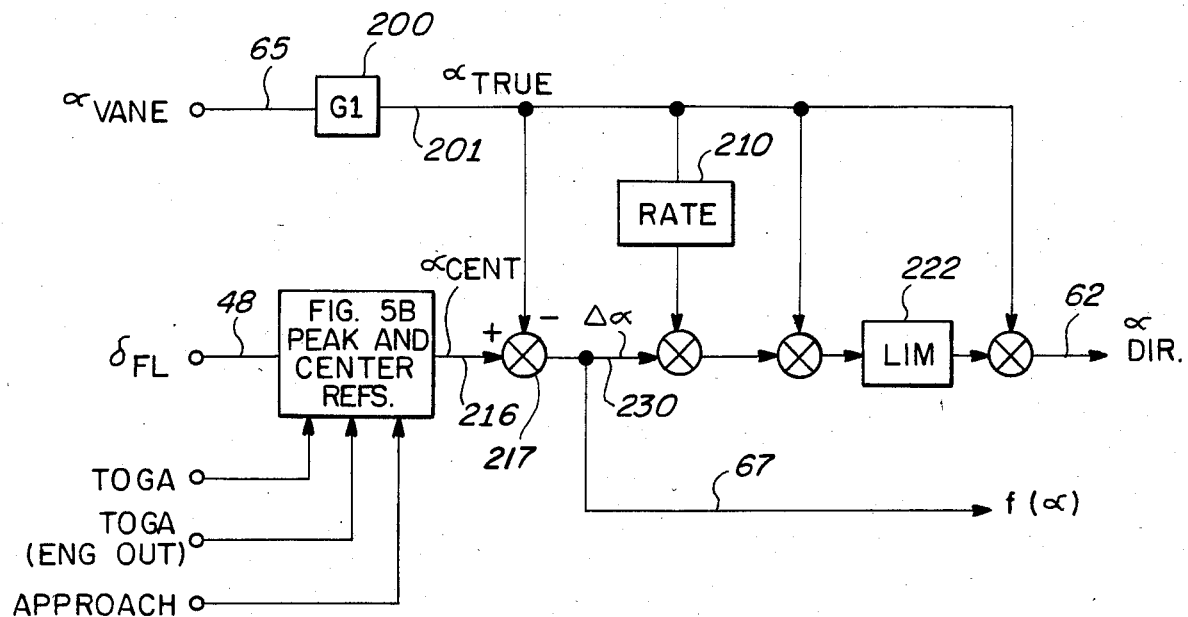
FIG. 7 is a block diagram of the alpha function computer of FIG. 4.

The details of the angle of attack function computer 64 are shown in FIG. 7. Basically, computer 64 provides a signal proportional to the error between the actual angle of attack of the aircraft and a center reference angle of attack for the particular mode of operation of the aircraft as shown in FIG. 5B for display, together with a peak angle of attack reference for use as an angle of attack command for the flight director. The angle of attack vane signal on lead 65 is passed through suitable gain 200 and provides on lead 201 a signal proportional to the true angle of attack or alpha of the aircraft. The flap angle signal on lead 48 is supplied to a source of reference angle of attack signal depending upon flight mode. It will be recalled in the discussion of FIG. 5B above that these reference angle of attack signals are a function of flap position and whether the aircraft is in an all engine TOGA mode, an engine out TOGA mode or in an approach mode and that these reference alpha signals correspond to a centered position of the fast/slow indicator 68. The discretes TOGA (ENG OUT), TOGA and APPR are supplied conventionally from the mode initiation switches which in turn supply reference alpha voltages on lead 216 in accordance with the curves shown in FIG. 5B. These reference voltages are identified as $\alpha_{CENT}$ since they represent the center position of the fast/slow indicator 68. The alpha reference signals are compared with the actual alpha signal on lead 201 at summing junction 217 to provide an alpha error signal $\Delta \alpha$ on lead 230. This is the signal supplied to the fast/slow meter 68 via lead 67.

The alpha error signal on lead 230 is supplied also to the flight director pitch command cue after being conditioned for flight director operation. This simply involves the addition of a damping term from rate taker 210 and conventional limiting by means of limiter 222. The final flight director alpha command signal appears on lead 62 which energizes a conventional flight director visual cue.

The fast/slow indicator 68 shown on FIG. 5A comprises a cue 69 which moves vertically against a fixed scale having an upper index 70, marked F, a center index 71 and a lower index 72, marked S. The characteristics of the angle of attack signal 67, FIG. 4, are such that the moving cue 69 will be positioned against the F index 70 when the true fuselage angle of attack of the aircraft is zero degrees. The cue will be positioned at the S index 72 when the true fuselage angle of attack is at a value corresponding to the stick shaker threshold. As stated above, the stick shaker is designed to provide an alert to the flight crew that the aircraft is nearing a stall condition.

When the moving cue 69 is adjacent to the center index 71, it indicates proper angle of attack for three separate conditions, designated 74,75,76 in the graphical plot of FIG. 5B which represents reference fuselage angle of attack values as functions of flap position. These are the stick shaker reference 72, the zero angle of attack reference 70 and the three center conditions which are all-engine takeoff/go-around (TOGA) 75, the failed engine TOGA 74 and the normal approach condition 76. The center values 74, 75, 76 serve as a valuable cross check on the validity of the signals since the flight crew can compare the airspeeds that exist when the angle of attack display is centered under normal conditions.

Figure 6:
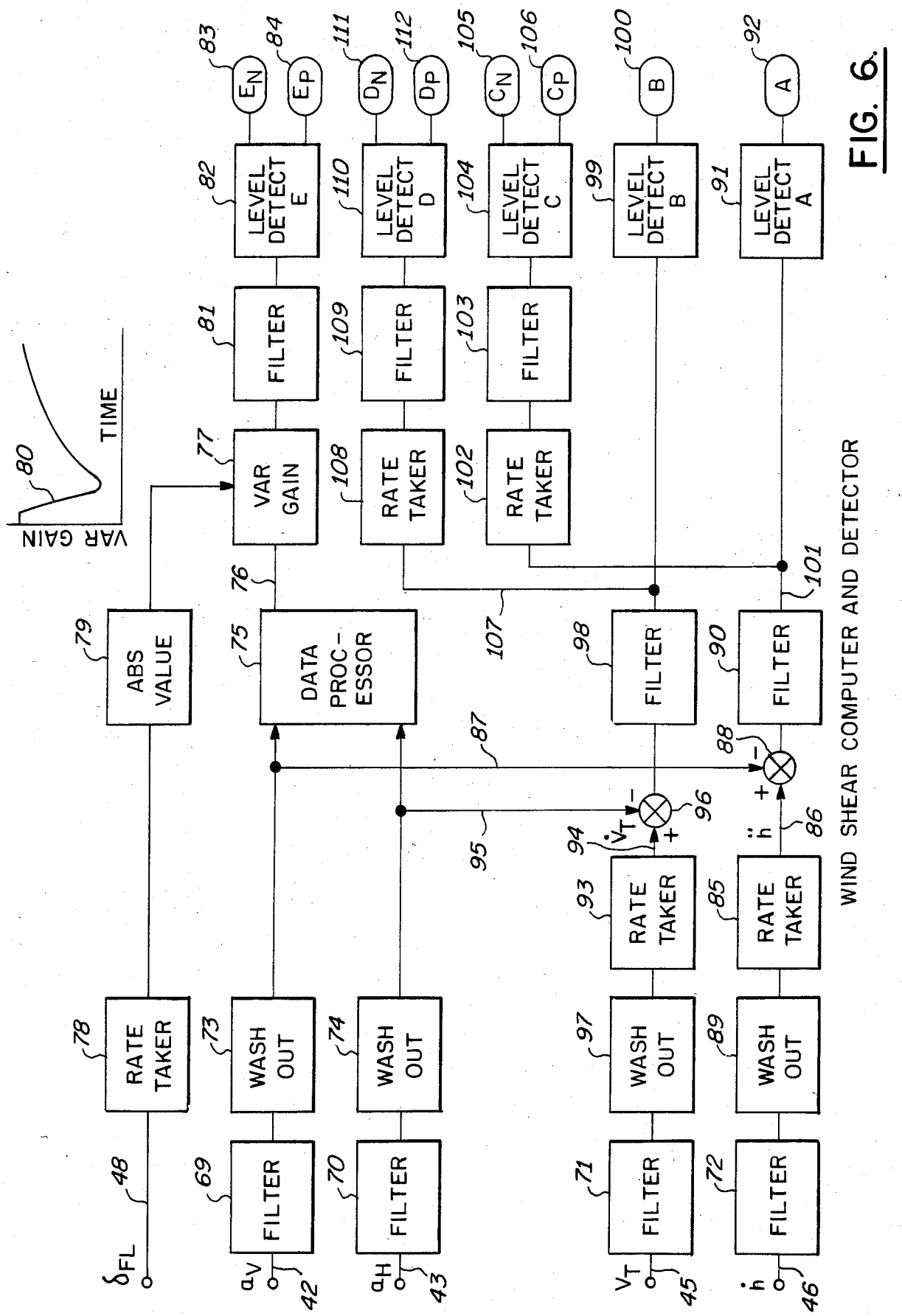
FIG. 6 is a block diagram which illustrates a preferred embodiment of the apparatus which generates the alert outputs of the windshear computer and detector of FIG. 4.

FIG. 6 is a preferred embodiment of the windshear computer and detector 44, FIG. 4. The sensor input signals to the windshear computer are 42, 43, 45, 46 as depicted in FIG. 4 and repeated in FIG. 6. Filters 69, 70, 71, 72 operate on the sensor signals 42, 43, 45, 46 to reduce the spurious noise that is a general characteristic of accelerometer and air data signals. The time constants of filters 69, 70, 71, 72 are all preferably identical in order to maintain a proper dynamic relationship between the signals.

Figure 8:
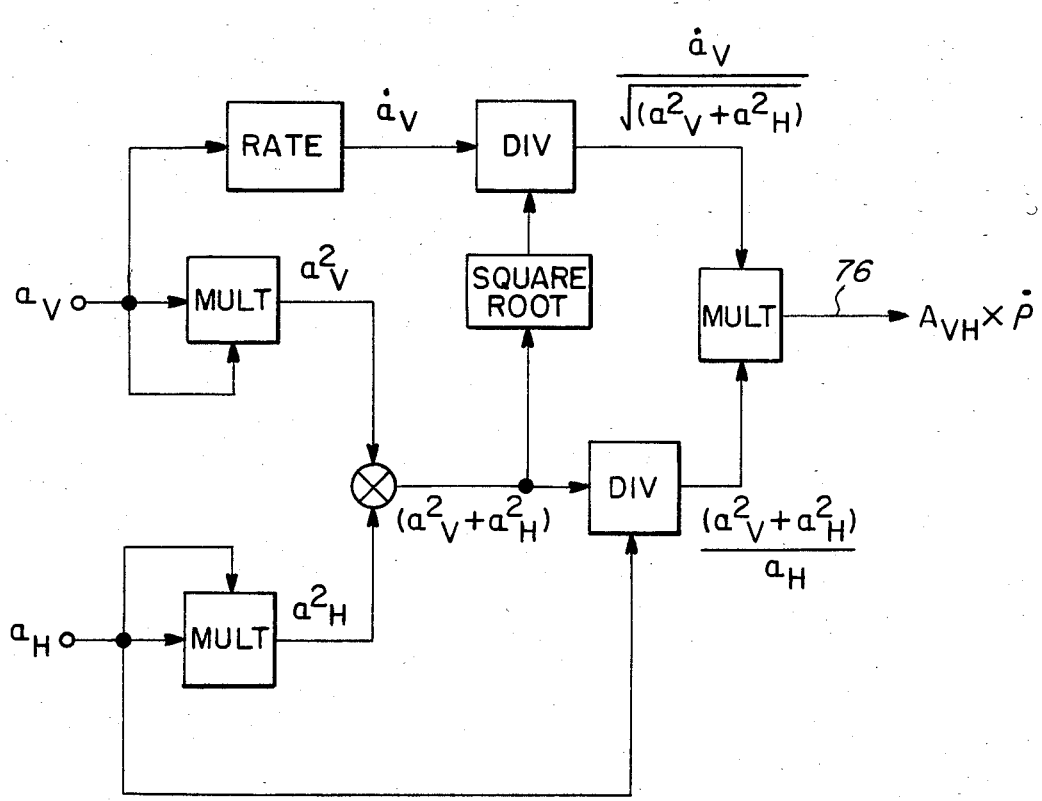
FIG. 8 is a block diagram of the data processor of FIG. 6.

The filtered $a_V$ and $a_H$ signals 42 and 43 are subjected to washouts 73 and 74 in order to remove any steady state stand-off signals which are also characteristic of accelerometer signals. The time constants of the washouts 73 and 74 are again preferably identical in order to maintain a proper dynamic relationship between the $a_V$ and $a_H$ signals. The washed out and filtered $a_V$ and $a_H$ signals are processed by data processor 75 to generate output signal 76 which represents the solution to the mathematical relationship 12, discussed above and which is the vector 18, FIG. 2, and is the vector product of $A_{VH}$ and $\dot{\rho}$. A block diagram of the data processor 75 is shown in FIG. 8. It will be appreciated that the data processor conventionally implements equation 12 and a detailed description thereof would be superfluous.

Normal extensions and retractions of aircraft flaps will result in sizeable acceleration vectors which must be compensated in order to avoid nuisance trips of the alert or warning signals. This is obtained by the variable gain block 77 which responds to signal on lead 48 proportional to movement of the flap position sensor 49, FIG. 4. This is processed through a rate taker 78 and absolute value detector 79 to generate a variable gain characteristic shown by the graph 80. Graph 80 shows that movement of the flaps results in a reduction in the gain of signal 76 which gradually recovers with time. A typical time period between the movement of the flaps and the recovery of substantially the full signal may be on the order of 60 seconds. The output of variable gain 77 is filtered by smoother filter 81 before entrance into level detector E where a high logic output is provided on terminal 83 when the output of filter 81 exceeds a preset negative value. Level detector 82 also provides a similar high logic signal for a positive signal. The logic signals on terminals 83 and 84 reflect disturbance relationship 5 above.

The filtered vertical speed signal 46 is operated on by washout 89 and rate taker 85 to generate an air data derived acceleration signal 86, designated , which is aircraft vertical acceleration relative to the air mass. This is compared to filtered inertial acceleration ($a_V$) signal 87 at summing junction 88 and then filtered at 90. The output from filter 90 is entered into 91, level detector A, where a high logic output is provided on terminal 92 when the output of filter 90 exceeds a preset positive or negative value. The logic signal on terminal 92 reflect the disturbance relationship 1 above.

The filtered true airspeed signal is operated on by washout 97 and rate taker 93 to generate an air data derived acceleration signal 94, designated $\dot{V}_T$, which is aircraft forward acceleration relative to the air mass. This is compared to filtered inertial acceleration ($a_H$) signal 95 at summing junction 96 and then filtered at 98. The output from filter 98 is entered into 99, level detector B, where a high logic output is provided on terminal 100 when the output of filter 98 exceeds a preset positive or negative value. The logic signal on terminal 100 reflects the disturbance relationship 2 above.

The signal 101 represents processed signal $-a_V$. This signal is further processed by rate taker 102 and filter 103 prior to entrance into 104, level detector C, where high logic outputs are provided on terminals 105 and 106. Terminal 105 represents a negative disturbance; terminal 106 represents a positive disturbance in accordance with relationship 3 above, both greater than a predetermined threshold value.

Signal 107 represents processed signal $\dot{V}_T - a_H$. This signal is further processed by rate taker 108 and filter 109 prior to entrance into 110, level detector D, where high logic outputs are provided on terminals 111 and 112. Terminal 111 represents a negative disturbance; terminal 112 represents a positive disturbance in accordance with relationship 4 above, both greater than a predetermined threshold value.

Two levels of alert are provided, one representing a moderate windshear condition; the other representing a severe windshear condition.

Figure 9:
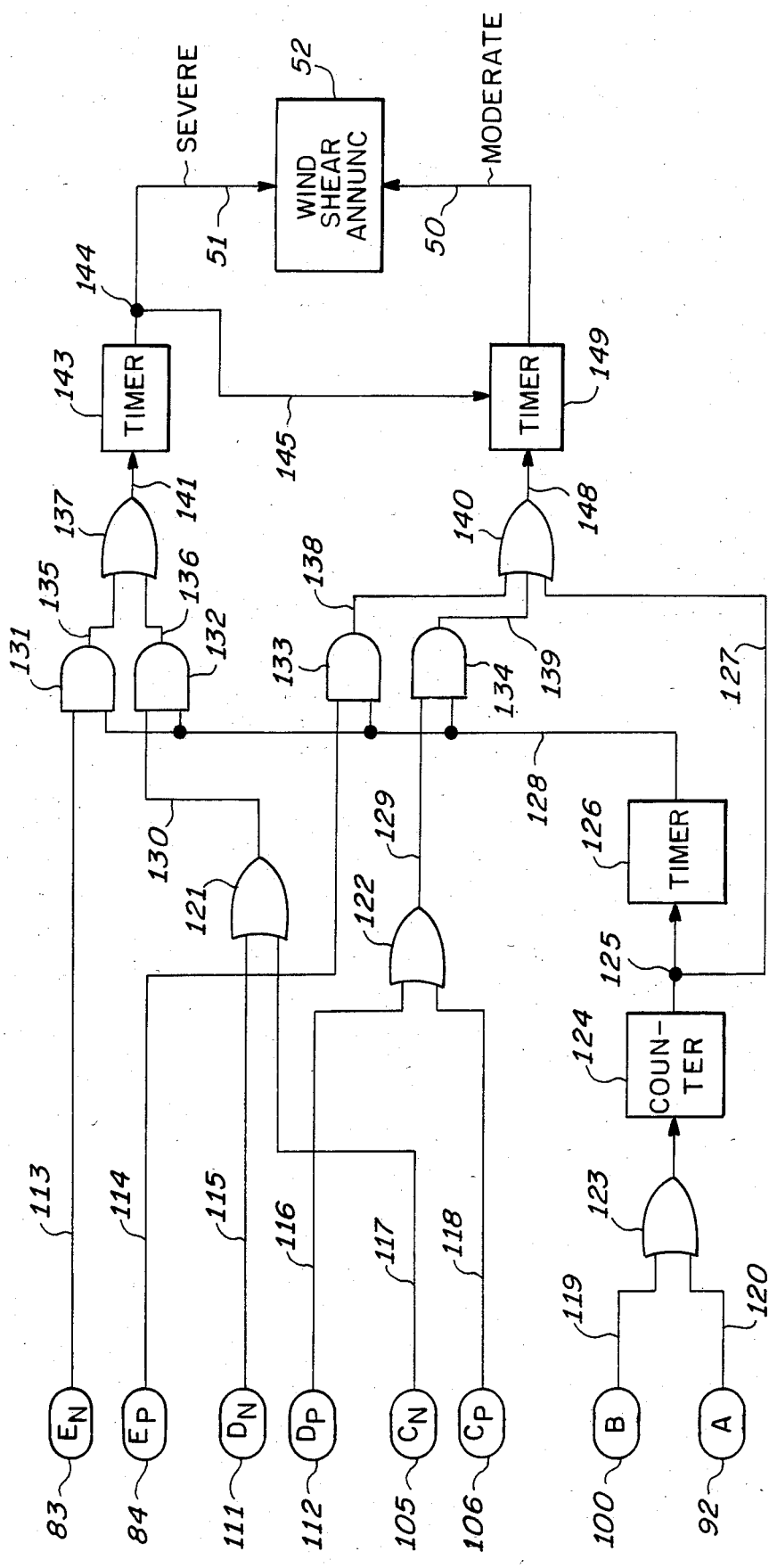
FIG. 9 is a diagram of the switching logic used to control the two level warning annunciator of FIG. 4.

Referring to FIG. 9, as discussed previously, logic levels indicative of windshear appear on terminals 83, 84, 111, 112, 105, 106, 100 and 92 of FIG. 6. The logic levels from terminal B, 100, and terminal A, 92 are supplied to conventional logic "OR" gate 123 via leads 119 and 120, respectively. Thus, the output of "OR" gate 123 will be a high logic signal if either or both leads 119 and 120 has a high logic signal. The output of gate 123 is impressed on counter 124. Counter 124 will output a high logic level signal if the output of gate 123 remains at a high logic level for a predetermined length of time, for example, three seconds. Otherwise, the output of counter 124 is maintained at a low logic signal.

The output of counter 124 appears at junction 125, one lead from which supplies timer 126. Timer 126 will output a high logic signal for a predetermined amount of time, for example, 20 seconds. If the output of counter 124 is ever at a high logic level, even momentarily, the output of timer 126 appears on lead 128 which is impressed as one input to conventional logic "AND" gates 131, 132, 133 and 134.

The logic signal from terminal 83 appears on lead 113 and impressed as one input to logical "AND" gate 131. The output of gate 131 appearing on lead 135 can be a high logic level signal if and only if the logical levels on leads 113 and 128 are high logic level signals.

The logic signal levels appearing at terminals 111 and 105 are impressed on conventional logical "OR" gate 121. The output of gate 121 on lead 130 will thus be a high logic signal if either or both leads 115 and 117 has a high logic signal. The logic signal level on lead 130 is impressed on conventional logical "AND" gate 132. The output of gate 132 appearing on lead 136 can thus be a high logic level signal if and only if the logical levels on leads 130 and 128 are high logic level signals.

The logic levels appearing on leads 135 and 136, discussed above, are impressed on conventional logical "OR" gate 137. The output of gate 137 appears at junction 141, one lead from which is impressed on timer 143. Timer 143 will output a high level logic signal for a predetermined time, for example, 10 seconds, if a high logic level signal appears at junction 141, even momentarily. If, at the completion of the predetermined time, a high logic level signal remains on lead 141, the timer will again output a high logic level signal for the predetermined time. Otherwise, the output of timer 143 will become a low logic level signal. The output of timer 143 appears at junction 144 and thence on lead 51 which is supplied to windshear annunciator 52. A high logic level signal on lead 51 causes a flashing windshear annunciation.

The logic level signal on terminal 84 appears on lead 114 and is thence supplied as one input to conventional logical "AND" gate 133. The output of gate 133 appears on lead 138 and will be a high logic level signal if and only if the logic level signals on leads 114 and 128 are high logic level signals.

The logic level signals from terminals 112 and 106 appear on leads 116 and 118 respectively and are thence supplied as inputs to conventional logical "OR" gate 122. The output of gate 122 appears on lead 129. The logic level signal on lead 129 will be a high logic level signal if either or both leads 116 and 118 has a high logic level signal. The logic level signal on lead 129 is supplied as one input to conventional logical "AND" gate 134. The output of gate 134, appearing on lead 139, will be a high logic level signal if and only if the logic level signals on leads 129 and 128 are high logic level signals.

Conventional logical "OR" gate 140 receives as inputs the signals on leads 138, 139 and 127. The output of gate 140 will be a high logic level signal if any one or any combination of the inputs on the aforementioned leads is a high logic level signal.

The output of gate 140 appears on lead 148 and is thence impressed on timer 149. Timer 149 operates in a manner similar to timer 143, discussed above. A high logic level signal output from timer 149, on lead 50, will cause a steady windshear annunciation.

The logic level appearing at junction 144 and on lead 145 is impressed on timer 149 such that a high logic level signal will cause an instantaneous low logic level signal on lead 50 regardless of the value of the logic level signal on lead 148 or the amount of elapsed time of timer 149. This action allows the flashing windshear annunciation to take precedence over the steady windshear annunciation should both events occur simultaneously.

The windshear detection logic provides the following features:

(A) the moderate windshear alert is generated when the input to detector A or the input to detector B rise above positive or negative preset trip levels for a predetermined amount of time. The moderate windshear alert remains active until the input to detector A and the input to detector B both drop below the trip level.

(B) Detectors C, D and E are armed to operate for a time interval which starts when the moderate windshear alert is actuated and ends a predetermined amount of time after the inputs to detectors A and B have fallen below the preset trip levels.

(C) When armed, positive polarity trips of detectors C, D and E will also operate the moderate windshear alert annunciation.

(D) When armed, negative polarity trips of detectors C, D, and E will operate the severe windshear alert annunciation.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Windshear detection and warning apparatus for aircraft comprising
    means for providing signals proportional to the magnitude of the vector values of the inertial vertical and horizontal acceleration of the aircraft, said signals corresponding to vector components of a resultant inertial acceleration of the aircraft,
    means responsive to said vertical and horizontal acceleration signals for providing a signal proportional to the product of magnitude and rate of rotation of the vector value of said resultant inertial acceleration of the aircraft, and
    windshear warning means responsive to values of said product signal in excess of a predetermined value.

2. The apparatus as set forth in claim 1 wherein said windshear warning means comprises
    means responsive to a first predetermined value of inertial acceleration for providing a warning of moderate windshear conditions, means responsive to a second predetermined value of inertial acceleration for providing a warning of severe windshear conditions, and windshear detection means for detecting values of said product signal of one sense for operating said moderate windshear condition warning means and for detecting values of said product signal in the opposite sense for operating said severe windshear warning means.

3. The apparatus as set forth in claim 2 further comprising air data computer means for providing signals proportional to the vertical and horizontal acceleration of said aircraft relative to its sustaining air mass, comparator means responsive to said inertial and air mass vertical and horizontal acceleration signals to form differences of said vertical and said horizontal signals respectively and for supplying corresponding windshear alert signals when at least one of said differences exceeds a predetermined value, means for arming said moderate windshear warning means and said severe windshear warning means, for operation by said windshear warning signal, and means responsive to said alert signals for arming said arming means.

4. The apparatus as set forth in claim 3 further comprising means responsive to said inertial and air mass vertical and horizontal acceleration signals respectively and for supplying corresponding windshear warning signals proportional to the respective algebraic values of the rate of change of said differences whether said values are positive or negative, and means responsive to said arming means for supplying rate of change signals of one algebraic sign to said moderate windshear warning means and of an opposite algebraic sign to said severe windshear warning means.

5. Windshear detection and warning apparatus for an aircraft having flight control instrumentation responsive to normal command signals for directing the aircraft along a predetermined flight path, said apparatus comprising means responsive to signals which vary in accordance with the vertical and horizontal components of aircraft acceleration relative to the ground and relative to the sustaining air mass for providing windshear warning signals proportional to deviations in excess of a predetermined value between said vertical components of said ground and air mass acceleration signals and between said horizontal components of said ground and air mass acceleration signals, means responsive to the angle of attack of the aircraft for providing a command signal corresponding to the maximum safe angle of attack of said aircraft, switching means for removing said normal command signal from said control instrumentation and for supplying said angle of attack command signal thereto, and means responsive to said windshear warning signals for signalling the operation of said switching means, wherein said windshear warning signals further include a component proportional to the magnitude and rate of rotation of a resultant acceleration vector derived by the vector addition of said vertical and horizontal components of said ground acceleration signals.

6. The apparatus as set forth in claim 5 wherein said aircraft also has an automatic throttle control system for the aircraft engines responsive to normal command signals, for maintaining aircraft speed at a predetermined value, said apparatus further including means for supplying a command signal corresponding to the maximum safe thrust for said engines, and further switching means for removing said normal command signal from said throttle control system and for supplying said maximum thrust command signal thereto, said further switching means being also operative in response to said windshear warning signalling means.

7. The apparatus as set forth in claim 5 wherein said windshear warning signals further include components proportional to the rate of change of said deviations between said vertical and horizontal components of said ground and air mass acceleration signals.

8. Windshear detection and warning apparatus for aircraft comprising means for providing a plurality of separate signals which vary in accordance with the vertical and horizontal acceleration of the aircraft relative to the ground, said signals corresponding to vector components of a total aircraft acceleration vector relative to the ground, means for providing a plurality of separate signals which vary in accordance with the vertical and horizontal acceleration of the aircraft relative to the sustaining air mass, means for comparing said plurality of signals varying with the vertical acceleration of the aircraft relative to the ground and relative to the sustaining mass, and for providing a signal indicative of a disparity thereof, means for comparing said plurality of signals varying with the horizontal acceleration of the aircraft relative to the ground and relative to the sustaining mass, and for providing a signal indicative of a disparity thereof, windshear detection means responsive to at least one of said signals indicative of a disparity for detecting windgusts in a plurality of opposing directions, means responsive to said vertical and horizontal signal comparing means for providing separate signals proportional to the rate of change of a disparity at least one of said compared signals, means for supplying said rate of change signals to said windshear detection means, means responsive to said ground referenced acceleration component signals for supplying a signal proportional to the product of the magnitude and rate of rotation of said total aircraft acceleration vector, and means for supplying said product signal to said windshear detection means.

9. The apparatus as set forth in claim 8, further comprising means for providing a warning of a first predetermined value of total aircraft acceleration relative to the ground representative of moderate windshear conditions, means for providing a warning of a second predetermined value of total aircraft acceleration relative to the ground representative of severe windshear conditions, and means responsive to said product signal of one sense for operating said moderate windshear warning means and of the opposite sense for operating said severe windshear warning means.

10. Windshear detector and warning apparatus for aircraft comprising means for comparing signals proportional to the vertical vector components of aircraft acceleration relative to the ground and relative to the sustaining air mass, for forming discrepancy signals thereof, means for comparing signals proportional to the horizontal vector components of aircraft acceleration relative to the ground and relative to the sustaining air mass, for forming discrepancy signals thereof, said vertical and horizontal components of vector acceleration relative to the ground defining a corresponding resultant ground acceleration vector, means responsive to said vertical comparing means and said horizontal comparing means for providing a first windshear warning characteristic upon either of said discrepancy signals exceeding a predetermined value, further means responsive to said compared signals for providing signals proportional to the rate of change of said discrepancy signals, means responsive to said first windshear warning characteristic and said rate of change signals for providing a second windshear warning characteristic upon at least one of said rate of change signals exceeding a predetermined value, means responsive to said signals proportional to the vertical and horizontal vector components of aircraft acceleration relative to the ground for providing a signal which varies in accordance with the magnitude and the rate of rotation of said corresponding vector resultant of said component acceleration vectors, and means responsive to said first windshear warning characteristic and said magnitude and rate of rotation signal for providing said second warning characteristic when said magnitude and rate of rotation signal exceeds a predetermined value.

11. The apparatus as set forth in claim 10 further comprising annunciator means responsive to said rate of change signals and said signal varying in accordance with said magnitude and rate of rotation for operating, when energized, said second windshear warning characteristic providing means, and timing means responsive to said discrepancy signals for energizing said annunciator means for a predetermined time period subsequent to at least one of said discrepancy signals exceeding said predetermined value associated therewith.

* * * * *